INVENTORS
FRANK R. CARLOCK
WILLIAM R. LAMOUREUX
BY John B. Frisone
ATTORNEY

Sept. 24, 1968 F. R. CARLOCK ET AL 3,403,286

DIGITAL CATHODE RAY TUBE DEFLECTION SYSTEM

Filed Dec. 27, 1966 2 Sheets-Sheet 2

United States Patent Office 3,403,286
Patented Sept. 24, 1968

3,403,286
DIGITAL CATHODE RAY TUBE DEFLECTION SYSTEM

Frank R. Carlock, Hyde Park, and William R. Lamoureux, Kingston, N.Y., assignors to International Business Machines Corporation, Armonk, N.Y., a corporation of New York Filed Dec. 27, 1966, Ser. No. 604,900
10 Claims. (Cl. 315—18)

ABSTRACT OF THE DISCLOSURE

In a cathode ray tube display system, a plurality of equally weighted current sources are digitally controlled to provide coarse deflection of the cathode ray beam. Another plurality of current sources, which are binarily weighted, are controlled by a binary counter to provide fine deflection. The current from the largest binary source is substantially equal to one half that of the equally weighted sources. The coarse and fine currents are combined to provide the desired deflection with a minimum of distortion.

This invention relates to cathode ray displays in general and more particularly to a novel deflection system suitable for use in such displays.

Digital deflection systems for computer controlled cathode ray display tubes have been utilized for some time. A typical system is shown in U.S. Patent 2,810,860 to Mark. The deflection system shown by Mark utilizes binary weighted switchable constant current sources to drive the deflection yokes. These sources are controlled directly by binary coded digital signals which may be derived from a control computer. Such a system is quite workable and in fact has found widespread usage in commercially marketed displays. It does, however, have a number of drawbacks which have been overcome but at increased hardware cost and complexity.

The most troublesome disadvantage of the straight binary weighted switchable constant current sources is the inherent lack of relative accuracy of the image. This inaccuracy results from the fact that one of the current sources must provide one half of the total current required for a full scale deflection while another current source provides only enough current for the smallest unit of deflection. Thus a one percent error in the sources causes an error in the larger source which is greater than the magnitude of the total current supplied by the smallest source. If this condition remains uncorrected, distortion results. The distortion may take many forms, i.e. lines longer or shorter than desired, angular distortion and curvilinear distortion. The distortion may be corrected in a number of ways, the most common and practical being a precise adjustment and compensation of the current sources. Such a correction is, however, costly in both material and time once the system becomes operational.

When transistors are utilized for switching the current sources another problem is introduced since the switches are required to handle widely varying amounts of current and their switching time is a function of the amount of current switched. Thus the switches operating on the larger current sources require more time to switch than those operating on the smaller current sources. It must be remembered that the ratio of the currents of the largest to the smallest in a typical 12 inch square display may be as much as 500:1. During switching the actual current supplied to the yoke may vary in a completely unpredictable manner and if no corrective action is taken, the beam, if "on," will skew causing undesirable distortion of the image on the screen. Here again the deficiency can be overcome but at a significant hardware cost.

The variable switching times for the different current sources in addition to the beam skewing problem discussed above introduces a delay since sufficient time must be allowed for worst case conditions. Thus under less than worst case conditions, which incidentally constitute 90% of all deflections, time is wasted before the deflection can begin.

One object of this invention is to provide a novel deflection circuit for a cathode ray tube display in which a plurality of substantially equal switchable current sources selectively supply the deflection currents to the cathode ray tube deflection yokes.

Another object of the invention is to provide a novel deflection circuit for a cathode ray tube display in which a combination of binary weighted and equal weighted switchable current sources selectively supply the deflection currents to the cathode ray tube deflection yokes.

A further object of the invention is to provide a novel deflection system as set forth above in which the binary weighted switchable current sources are controlled by the low order bits of a digital control signal and the magnitude of the largest binary weighted current source is substantially one half the value of the equally weighted current sources.

The foregoing and other objects, features and advantages of the invention will be apparent from the following more particular description of preferred embodiments of the invention as illustrated in the accompanying drawings.

Figure 1:
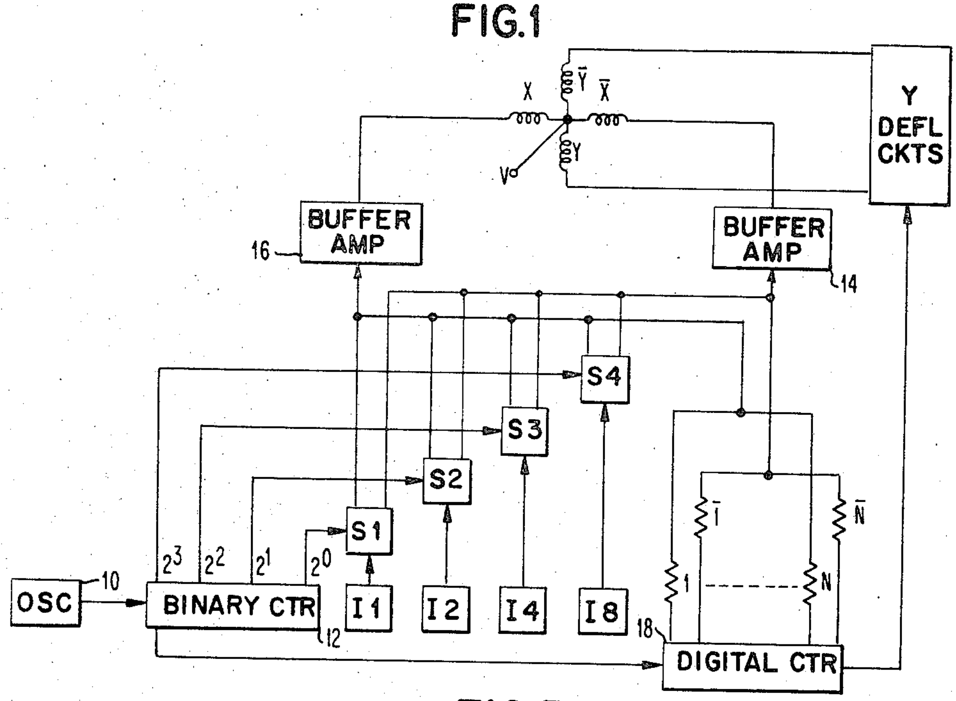
FIGURE 1 is a schematic diagram of a novel deflection system constructed in accordance with the invention.
Figure 2:
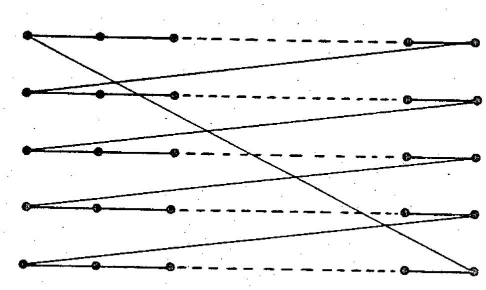
FIGURE 2 is a schematic illustration of the beam movement provided by the novel deflection circuit illustrated in FIGURE 1.

FIGURE 1 illustrates a typewriter type display in which the beam moves as illustrated in FIGURE 2. The beam starts at the upper left hand corner and moves to the first dot on the first horizontal line where it pauses. At this time a character may be inserted or the beam may be utilized to display a condition by the presence or absence of light. Since the utilization of the beam at the pause points (illustrated by the dots in FIG. 2) does not constitute part of the invention it will not be further described. The beam continues to move in steps, pausing at the end of each step till it reaches the last dot on the first horizontal line. At this time the beam retraces horizontally to the first dot of the second horizontal line and the movement continues as described above. When the beam reaches the last dot of the last horizontal line it retraces horizontally and vertically to the first position described above.

The rate at which the beam moves from position to position, as identified by the dots of FIG. 2, is controlled by the frequency of a free running oscillator 10 which causes a binary counter 12 to increment. The outputs of counter 12 control double throw electronic switches S1, S2, S3 and S4 which in turn control the flow of current from binary weighted current sources I1, I2, I4 and I8, respective, into either the X or $\overline{X}$ winding of the deflection yoke as a function of the value of the counter. Thus when counter 12 is all zero, switches S1–S4 connect current sources 11–18 to the $\overline{X}$ winding via a buffer amplifier 14. As the counter changes state, one unit of current is switched out of $\overline{X}$ yoke and into X yoke via a buffer amplifier 16. This causes the beam to move to the right one unit at a time. These units are frequently called raster units and the distance the beam is displaced per raster unit is a function of the change in yoke current per increment of counter 12.

Binary counter 12 counts up to its maximum value and then returns to zero and continues to repeat as oscillator 10 supplies a continuous train of pulses. When the counter resets to zero a pulse is supplied to a digital counter 18. This counter is provided with N stages, each of which controls a unit of current. The current supplied by each stage is limited by equal resistors (1–N) and ($\overline{1}$–$\overline{N}$), respectively. The current supplied via resistors (1–N) is summed in buffer amplifier 16 with the current supplied via switches (S1–S4) and comprises the total deflection current through the X yoke. The current supplied via resistors ($\overline{1}$–$\overline{N}$) is summed in buffer amplifier 14 with the current from switches (S1–S4) and comprises the total deflection current through the $\overline{X}$ yoke. The sum of the deflection currents in the X and $\overline{X}$ yokes is a constant and changes by an amount equal to I1 with each pulse from oscillator 10 until such time as counters 12 and 18 simultaneously reset, at which time all the current is carried by the $\overline{X}$ yoke. Resistors (1–N) and ($\overline{1}$–$\overline{N}$) must be selected so that the current controlled by each stage of counter 18 is substantially equal to the sum of currents $[(2\times I1)+I2+I4+I8]$. If this proportioning is provided the beam will step in equal increments across the screen, since counter 18 will step at the same time counter 12 resets. Thus, the combination of counter 12 resetting and counter 18 stepping produces a net change in deflection current in the X and $\overline{X}$ yokes of I1 which is the same change produced each time counter 12 is stepped with the exception of the reset. Each stage of digital counter 18 returns one or the other of the pair of connected equal resistors to a reference potential and the other resistor of the pair remains open. Since the pairs of resistors (1, $\overline{1}$ to N, $\overline{N}$) are all of equal value, each stage of counter 18 controls an equal amount of current for the yokes. If a stage is set to the "one" state the current controlled by that stage is supplied to the X yoke via buffer amplifier 16 and if set to the "zero" state the current is supplied to the $\overline{X}$ yoke via buffer amplifier 14.

It should be apparent that this deflection system overcomes the difficulties set forth above since no current source is required to supply sufficient current to produce a half screen deflection and furthermore, since no switch carries substantially more current than any other switch, beam skew resulting from substantially different switching times is virtually eliminated.

Thus far only horizontal beam deflections have been described. Vertical deflections in the typewriter mode, in accordance with the embodiment of FIGURE 1, are accomplished in substantially the same way, however, instead of utilizing a separate oscillator the resetting of counter 18 is utilized to perform this function since counter 18 resets only at the end of a horizontal line. The counters in the vertical deflection system are operated somewhat differently since the beam moves from the top to bottom of the tube screen. Thus, the counters must be decremented rather than incremented as are the horizontal counters.

Figure 3:
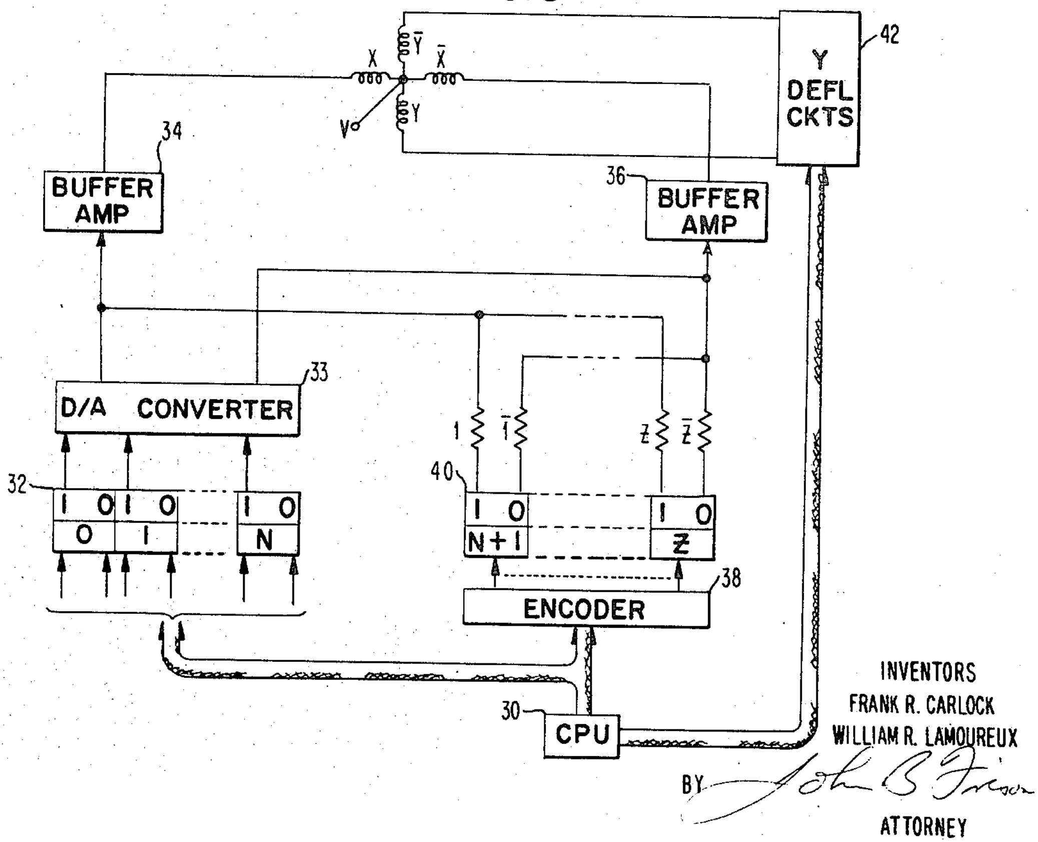
FIGURE 3 is a schematic diagram of another embodiment of the novel deflection system in accordance with the invention.

The embodiment of FIGURE 3 is particularly suited for generating computer controlled graphic displays. In displays of this type a computer supplies the X and Y coordinates of a series of end points which define a corresponding series of beam movements. This data along with the corresponding beam intensity data is sufficient to define a graphical image. The (X, Y) position data supplied by the computer is in digital form and must be converted to analog currents corresponding thereto.

The low order binary bits defining the X coordinate of the end point of a given line are transferred from the computer 30 to a binary register 32. The outputs of register 32 are applied to a digital to analog converter

33 which includes binary weighted current sources and switches and may be constructed as shown in FIGURE 1 and described above. The current supplied by converter 33 to the X and $\overline{X}$ windings of the deflection yoke via buffer amplifiers 34 and 36, respectively, is a function of the value of the N low order bits supplied by the computer. For example, assuming $N=3$ and the three low order bits are in increasing order 101 the X winding will receive 5H units of current while the $\overline{X}$ winding will receive 2H units of current. Here, H is a constant and is determined by the circuit parameters. If the three low order bits were 000 no current would be supplied to the X winding and 7H units would be supplied to the $\overline{X}$ winding.

Figure 4:
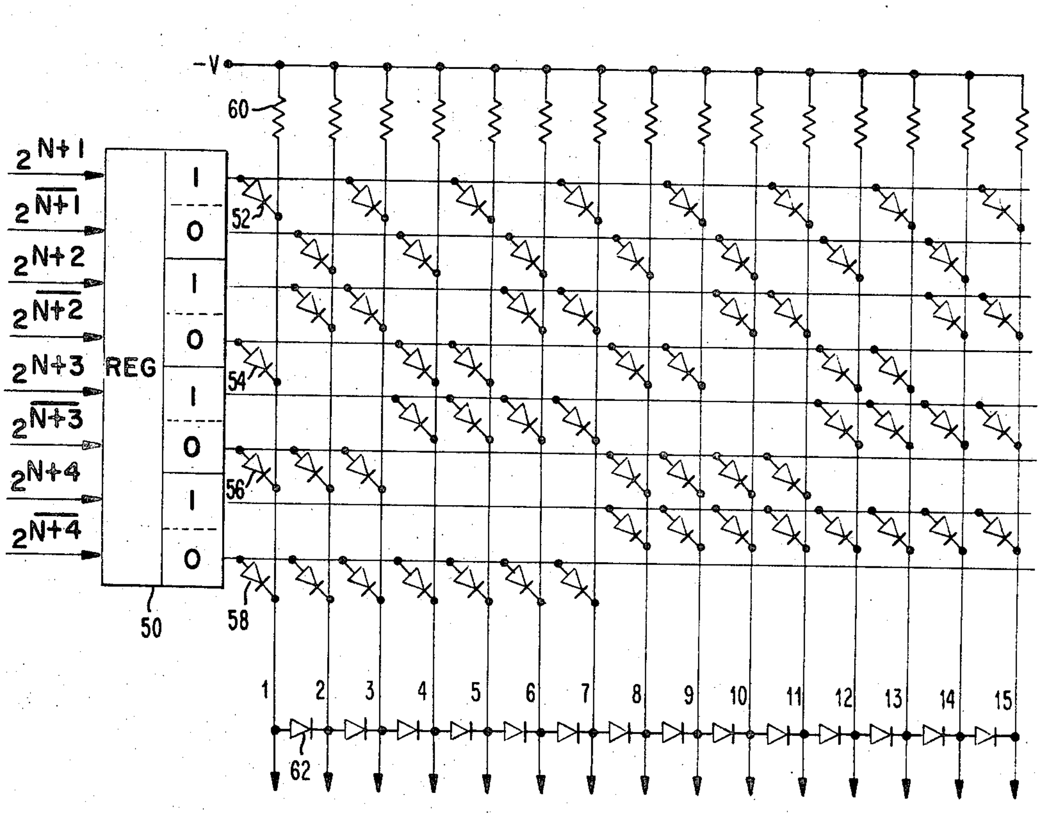
FIGURE 4 is a schematic diagram of a component utilized in the circuit of FIGURE 3.

The remaining high order bits of the X position signal are applied to an encoder 38, the details of which are shown in FIGURE 4. Encoder 38 has $(Z-N)$ output lines which represent the value of the high order bits in decimal form. Thus, if only the lowest order bit of this group is a "one" the $(N+1)$ stage of a register 40 will be set to "one" and the remaining stages $[(N+2)$ to $Z]$ will be set to "zero." Each stage of register 40 returns one or the other of a pair of equal resistors to a reference potential and the other resistor of the pair remains open.

The pairs of resistors (1, $\overline{1}$ to Z, $\overline{Z}$) are all of equal value thus each stage of register 40 controls an equal amount of current for the yoke. If a stage is set to the "one" state the current is supplied to X yoke via buffer amplifier 34 and if set to "zero" state the current is supplied to the $\overline{X}$ yoke via buffer amplifier 36. The resistors connected to register 40 are proportioned in the same manner as are those connected to digital counter 18 of FIGURE 1 and perform the same function.

With only the lowest of the high order bits a "one," one coarse unit of displacement current will be provided in the X winding and $[Z-(N+1)]$ coarse units will be provided in the $\overline{X}$ winding. When all the high order bits are "one," the X winding will receive $(Z-N)$ coarse units and the $\overline{X}$ winding none and the current conditions in the X and $\overline{X}$ winding will reverse if the high order bits are all zero. At intermediate values the number of coarse units of current in the X and $\overline{X}$ winding will be proportional to the value of the binary signal applied to the encoder. How the encoder supplies the control signals for register 40 will be obvious as description continues.

The encoder 38, which is shown in detail in FIGURE 4, includes a register 50 which receives the high order bits from the computer 30 one endpoint at a time in sequence. The bits for each endpoint are supplied in parallel to the register 50 and successive endpoints are supplied at times determined by either the time for the maximum possible deflection or asynchronously as each deflection is completed. Since the details of the two techniques are not pertinent to the invention they have not been illustrated. Register 50 is provided with as many positions as there are high order bits. Only four are shown for illustration purposes. These will decode down to fifteen output lines. Each output line is the output of a four input "AND" circuit. For example, line 1 includes four diodes 52, 54, 56 and 58. Diodes 52 is connected to the "one" output of the lower order stage and diodes 54, 56 and 58 are connected to "zero" outputs of the three next succeeding stages. A resistor 60 connected between the output and a voltage source V completes the gate. If the input to register 50 is coded (1000) an output will be developed on line 1 only since all of the other AND circuits will have one or more inputs which fail to comply with conditions necessary to provide an output. As the input code changes to (0100) line 2 provides an output indicating a "one" and in addition this output is reflected to line 1 via a diode 62. Similar diodes are utilized to interconnect the other higher order output lines in the same manner and, thus, when any line is selected all lower order lines are also selected. The table below indicates the line selection as a function of the input code to register 50.

TABLE

| N+1 | N+2 | N+3 | N+4 | Lines |
|---|---|---|---|---|
| 1 | 0 | 0 | 0 | 1 |
| 0 | 1 | 0 | 0 | 1–2 |
| 1 | 1 | 0 | 0 | 1–3 |
| 0 | 0 | 1 | 0 | 1–4 |
| 1 | 0 | 1 | 0 | 1–5 |
| 0 | 1 | 1 | 0 | 1–6 |
| 1 | 1 | 1 | 0 | 1–7 |
| 0 | 0 | 0 | 1 | 1–8 |
| 1 | 0 | 0 | 1 | 1–9 |
| 0 | 1 | 0 | 1 | 1–10 |
| 1 | 1 | 0 | 1 | 1–11 |
| 0 | 0 | 1 | 1 | 1–12 |
| 1 | 0 | 1 | 1 | 1–13 |
| 0 | 1 | 1 | 1 | 1–14 |
| 1 | 1 | 1 | 1 | 1–15 |

The output lines shown in FIGURE 4 are connected to register 40 as shown in FIGURE 3.

The deflection circuits for the vertical or Y axis 42 are identical in all respects to those illustrated for the horizontal or X axis and therefore have been shown as single block.

While the invention has been particularly shown and described with reference to preferred embodiments thereof, it will be understood by those skilled in the art that various changes in form and details may be made therein without departing from the spirit and scope of the invention.

What is claimed is:

1. A deflection system for a cathode ray tube comprising,
- first means for effecting deflection of a cathode ray beam in response to electric signals applied thereto,
- second means including a plurality of binary weighted current sources,
- third means for selectively applying the currents supplied by said second means to said first means to provide a signal corresponding to the selection,
- fourth means including a plurality of equally weighted current sources, and
- fifth means for selectively applying the currents supplied by said fourth means to said first means to provide signals corresponding to the selection whereby the total sigal applied to the first means is the composite of the signals supplied by the selected second and fourth means.

2. A deflection system as set forth in claim 1 in which each equally weighted current source supplies substantially the same amount of current supplied by the total of all the binary weighted current sources plus an amount equal to the smallest binary weighted source.

3. A deflection system for a cathode ray deflection tube comprising,
- first and second deflection yokes for deflecting the cathode ray beam in orthogonal directions,
- first and second means each including a plurality of binary weighted current sources,
- third and fourth means for selectively applying the currents supplied by said first and second means to said first and second yokes, respectively, to provide signals corresponding to the respective selections,
- fifth and sixth means each including a plurality of equally weighted current sources, and
- seventh and eighth means for selectively applying the currents supplied by the fifth and sixth means to said first and second deflection yokes, respectively, to provide signals corresponding to the respective selections and the total signal supplied to each yoke is the composite of the binary weighted and equal weighed currents applied thereto.

4. A deflection system as set forth in claim 3 in which each equally weighted current source supplies substantially the same amount of current supplied by the total of all the binary weighted current sources plus an amount equal to the smallest binary weighted source.

5. A deflection system for a cathode ray tube display comprising,
- first and second deflection yoke means for deflecting the cathode ray beam in orthogonal directions,
- first converter means including a plurality of binary weighted current sources,
- an oscillator for providing pulses,
- a first binary counter responsive to said oscillator for cyclically increasing its count by one in response to each pulse from said oscillator,
- first circuit means responsive to said first binary counter for connecting said binary weighted current sources to the first yoke means such that the current supplied corresponds to the value of the said first binary counter,
- a first digital counter responsive to the first binary counter and arranged to increase its count by one each time the first binary counter completes a full cycle of operation,
- second circuit means including a plurality of equally weighted circuit elements connected to the first yoke means and responsive to the first digital counter for supplying a number of equal units of current corresponding to the value of the first digital counter,
- a second binary counter responsive to the first digital counter and arranged to decrease its count by one each time the first digital counter completes a cycle and resets to zero,
- second converter means including a plurality of binary weighted current sources,
- third circuit means responsive to said second binary counter for connecting said binary weighted current sources to the second yoke means such that the current supplied corresponds to the value of the said second binary counter,
- a second digital counter responsive to the second binary counter and arranged to decrease its count by one each time the second binary counter completes a full cycle of operation, and
- fourth circuit means including a plurality of equally weighted circuit elements connected to the second yoke means and responsive to the second digital counter for supplying a number of equal units of current corresponding to the value of the second digital counter.

6. A deflection system for a cathode ray tube display comprising,
- first means for effecting deflection of a cathode ray beam in response to electric control signals applied thereto,
- second means including a plurality of weighted current sources,
- third means for selectively applying the currents supplied by said second means to said first means to provide a signal corresponding to the selection,
- fourth means including a plurality of weighted current sources each of which supplies substantially the same amount of current supplied by the total of all of the current sources of the second means plus an amount equal to the smallest weighted source, and
- fifth means for selectively applying the currents supplied by said fourth means to said first means to provide signals corresponding to the selection whereby the total control signal applied to first means is the composite of the signals supplied by the selected second and fourth means.

7. A deflection system for a cathode ray tube display comprising,
- first and second deflection yoke means for deflecting the cathode ray beam in orthogonal directions,
- first and second deflection control means for supplying deflection currents to said first and second yoke means, respectively, in response to signals defining the required beam deflection as the rectangular coordinate of the endpoint of the desired deflection from its attained position, said first and second deflection control means each including, a plurality of binary weighted current sources, switch means for selectively applying the currents from the sources to the respective yoke means in response to control signals, a binary register responsive to predetermined low order elements of the signals defining the respective rectangular coordinate of the desired deflection and providing an output for controlling the said switch means so the net deflection current supplied to the respective yoke means corresponds in magnitude to the value of the associated coordinate defining signal, a digital register means responsive to predetermined high order elements of the signals defining the respective rectangular coordinates of the desired deflection and providing an output corresponding thereto, and a plurality of equally weighted circuit elements connected to the respective yoke means and responsive to output of the respective digital register means for supplying a number of equal units of current to the connected yoke means which corresponds to the value of the said predetermined high order signal elements.

8. A deflection system for a cathode ray tube display comprising means for deflecting a cathode ray beam in response to electrical control signals applied thereto, a plurality of current sources having weighted values in accordance with a first radix for providing a coarse deflection of said cathode ray beam, a plurality of second current sources having weighted values in accordance with a second radix for providing a fine deflection of said cathode ray beam, and means for combining current from said first and second plurality of current sources to provide the control signals to said deflection means.

9. A deflection system in accordance with claim 8 which further includes first switching means for selecting outputs from said first current sources, and second switching means for selecting outputs from said second current sources, said combining means being effective to combine the outputs selected by said first and second switching means for providing control signals to said deflection means.

10. A deflection system in accordance with claim 8 in which said first current sources supply substantially equal amounts of current.

References Cited

UNITED STATES PATENTS 3,325,803 6/1967 Carlock ------------ 340—324

RODNEY D. BENNETT, *Primary Examiner.*

T. H. TUBBESING, *Assistant Examiner.*